(12) United States Patent
Zuch

(10) Patent No.: US 6,950,489 B2
(45) Date of Patent: Sep. 27, 2005

(54) GUIDE TUBE FOR AN INSTRUMENTATION LANCE EXTENDING INTO A PRESSURE VESSEL, REACTOR PRESSURE VESSEL, AND A METHOD FOR PREVENTING THE ACCUMULATION OF PARTICLES OUTSIDE THE PRESSURE VESSEL IN A GUIDE TUBE

(75) Inventor: Gerhard Zuch, Fürth (DE)

(73) Assignee: Framatome ANP GmbH, Erlangen (DE)

( * ) Notice: Subject to any disclaimer, the term of this patent is extended or adjusted under 35 U.S.C. 154(b) by 0 days.

(21) Appl. No.: 10/657,927

(22) Filed: Sep. 9, 2003

(65) Prior Publication Data
US 2005/0129164 A1 Jun. 16, 2005

Related U.S. Application Data

(63) Continuation of application No. PCT/EP02/02166, filed on Feb. 28, 2002.

(30) Foreign Application Priority Data
Mar. 9, 2001 (DE) .................................. 101 11 370

(51) Int. Cl.⁷ .............................................. G21C 17/00
(52) U.S. Cl. ....................... 376/254; 376/203; 376/260; 376/310; 376/313; 376/316; 376/352
(58) Field of Search ................................. 376/310, 254, 376/260, 316, 203, 352, 313

(56) References Cited

U.S. PATENT DOCUMENTS
4,318,776 A 3/1982 Pröll et al.

FOREIGN PATENT DOCUMENTS
DE 43 03 746 A1 3/1994
EP 531087 * 3/1993

* cited by examiner

*Primary Examiner*—Jack Keith
(74) *Attorney, Agent, or Firm*—Laurence A. Greenberg; Werner H. Stemer; Ralph E. Locher

(57) ABSTRACT

The invention relates to a guide tube especially for an instrumentation lance extending into a reactor pressure vessel. The guide tube includes a lower tube section and an upper tube section that extends into the interior of the reactor pressure vessel. In order to prevent radioactively contaminated particles from reaching the lower tube section disposed outside the reactor pressure vessel from forming a source of radiation, a separator is arranged in the upper tube section. The separator has a separation chamber in which the particles are deposited and are removed from the water.

9 Claims, 4 Drawing Sheets

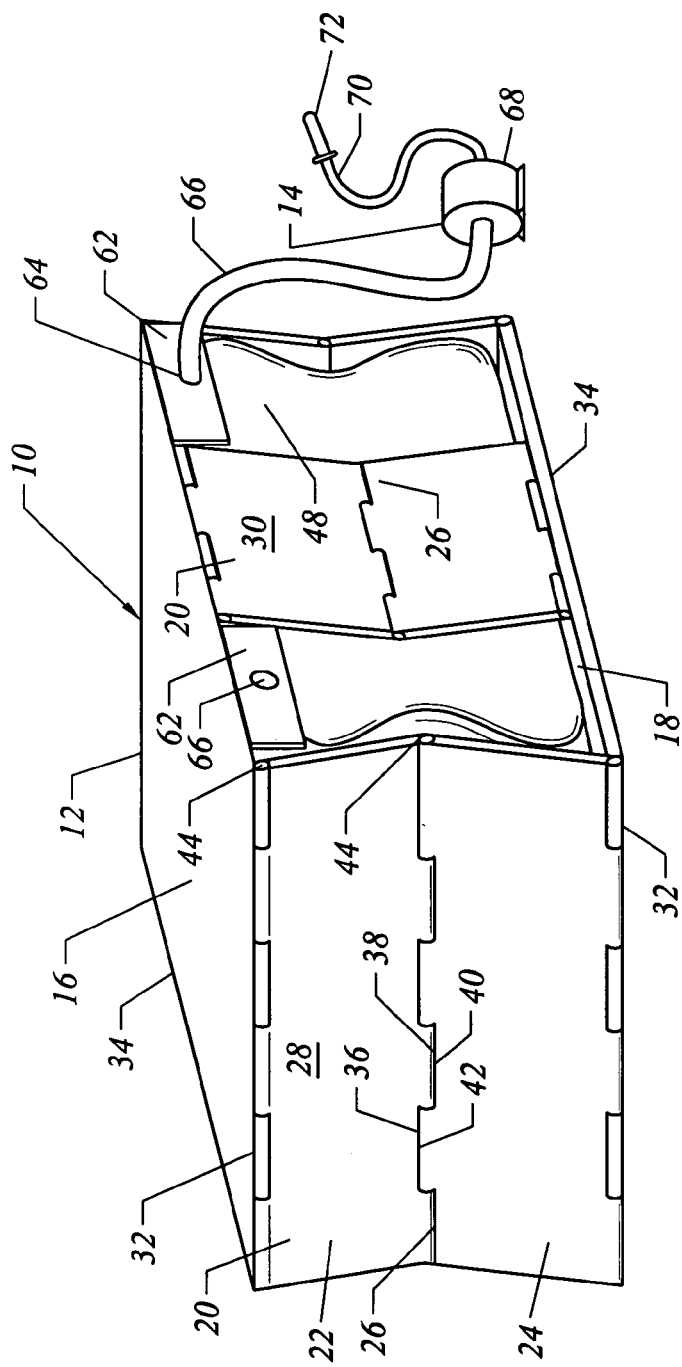
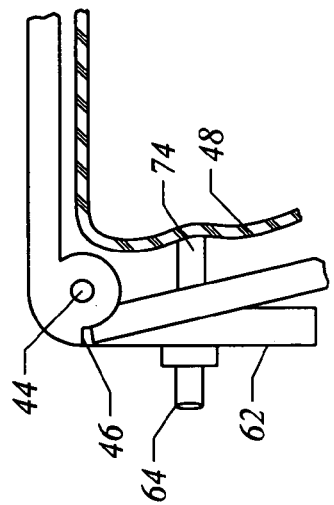

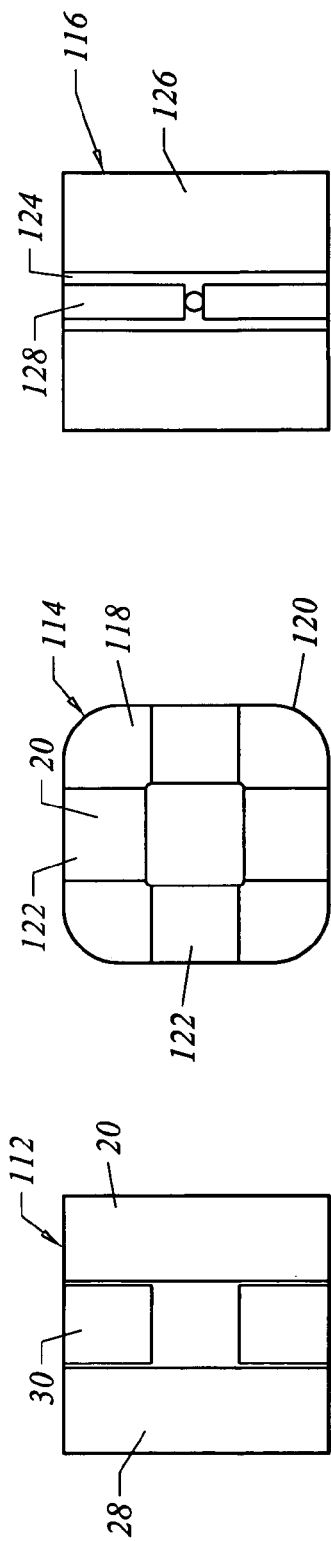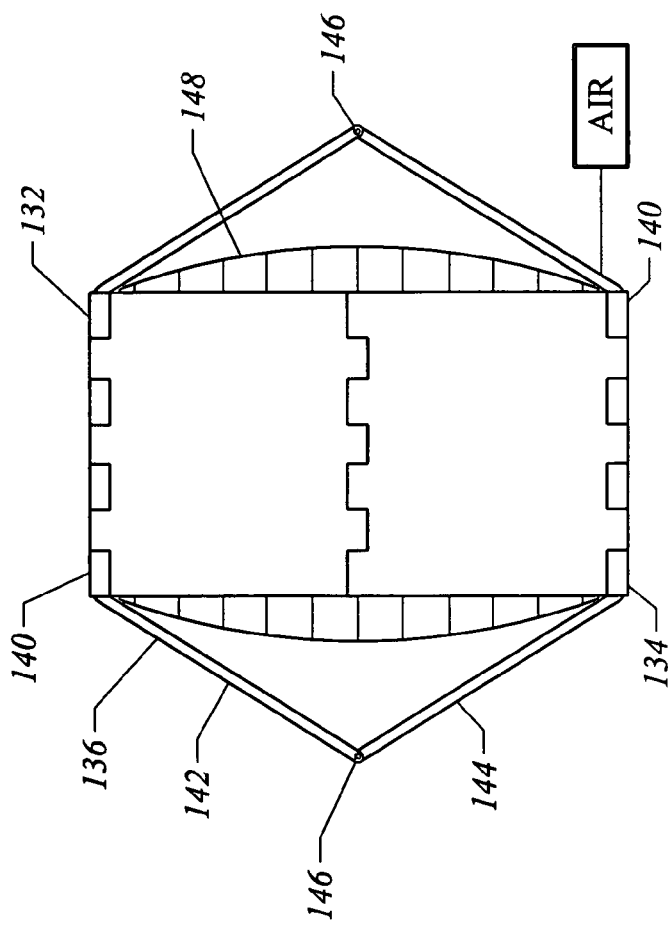

GUIDE TUBE FOR AN INSTRUMENTATION LANCE EXTENDING INTO A PRESSURE VESSEL, REACTOR PRESSURE VESSEL, AND A METHOD FOR PREVENTING THE ACCUMULATION OF PARTICLES OUTSIDE THE PRESSURE VESSEL IN A GUIDE TUBE

CROSS-REFERENCE TO RELATED APPLICATION

This application is a continuation of copending International Application No. PCT/EP02/02166, filed Feb. 28, 2002, which designated the United States and was not published in English.

BACKGROUND OF THE INVENTION

Field of the Invention

The invention relates to a guide tube which extends into a pressure vessel, in particular into a pressure vessel in a nuclear power station, and in which a so-called instrumentation lance is guided. The invention also relates to a method for preventing an accumulation of particles, in particular, radioactively loaded particles in the guide tube outside the pressure vessel.

The guide tube is often passed into the pressure vessel through its base, so that it includes an upper tube part, which is arranged in the pressure vessel, and a lower tube part, which projects out of the pressure vessel. The lower tube part is closed at the end by a closure flange. The guide tube has a flow connection to the interior of the pressure vessel and is also filled with water, in the same way as the pressure vessel. The pressure vessel is, in particular, a reactor pressure vessel or else a steam generator for a nuclear power station, in which radioactively loaded water or steam is located. The instrumentation lance normally has measured instrumentation for measuring the pressure, the temperature, the neutron flux, the filling level, etc. in the pressure vessel.

Temperature fluctuations result in the water being forced into the interior of the pressure vessel out of the guide tube when it is heated. Conversely, when the temperature decreases, water is sucked out of the pressure vessel into the guide tube. The temperature changes are caused, for example, by different operating states of the reactor pressure vessel. Large temperature differences occur in particular when starting and shutting down the nuclear power station, during which, for example, the water that is located in the reactor pressure vessel is heated from 20° to 300° C.

When water enters the guide tube from the pressure vessel, radioactively loaded contamination particles, inter alia, are also introduced into the guide tube, and are deposited at the lower end of the guide tube, which is closed by the closure flange. There, they form a highly radioactively emitting source outside the pressure vessel and represent a significant danger source for the workers during maintenance work.

SUMMARY OF THE INVENTION

It is accordingly an object of the invention to provide a guide tube for an instrumentation lance extending into a pressure vessel, a reactor pressure vessel for a nuclear power station, and a method for preventing the accumulation of particles outside of a pressure vessel in a guide tube for an instrumentation lance extending into a pressure vessel, which overcomes the above-mentioned disadvantages of the prior art apparatus and methods of this general type.

In particular, it is an object of the invention to prevent the accumulation of particles in the guide tube outside the pressure vessel.

With the foregoing and other objects in view there is provided, in accordance with the invention, a guide tube for guiding an instrumentation lance into an interior of a pressure vessel. The guide tube includes: a lower tube part; an upper tube part for configuration in the interior of the pressure vessel; and a separator for particles. The separator is configured in the upper tube part. The guide tube enables the instrumentation lance to extend into the pressure vessel. This embodiment is based on the idea that, when a temperature fluctuation occurs, although it is possible for water to enter the guide tube from the pressure vessel which, in particular, is in the form of a reactor pressure vessel, the water can, however, be separated in the guide tube from particles, in particular, the radioactively loaded particles, and the particles can be kept back in the upper tube part. The separator is thus used to separate the water from the loaded particles, which accumulate in the separator. Since the upper tube part is located in the interior of the pressure vessel, they do not form a radiation source acting outside the pressure vessel. This safely prevents any load on the workers during maintenance work.

The separator advantageously has a separation chamber with a chamber base, and the separation chamber has a first flow connection to the lower tube part. This first flow connection in this case has an outlet opening that is arranged in the separation chamber, and at a distance from the chamber base.

The chamber base in this case advantageously acts as a settling base, on which the particles which are introduced into the guide tube are deposited as a sediment. The outlet opening, which is arranged above the chamber base, of the flow connection allows water to pass from the upper tube part into the lower tube part without the particles, which have been deposited as a sediment on the chamber base, being carried with it. The arrangement of the chamber base with the flow connection thus on the one hand allows the particles to settle in the upper tube part while, at the same time, it allows unloaded water to be exchanged without any problems between the upper tube part and the lower tube part.

The separation chamber is expediently in the form of a closed chamber, and for this purpose has a chamber cover. A second flow connection is additionally provided between the separation chamber and the interior of the pressure vessel. The arrangement of the chamber cover and the boundary of the separation chamber that is connected to it prevents particles from entering the outlet opening from the first flow connection.

As an alternative to this, it is possible for the separation chamber to be open at the top, and for the entry of particles into the outlet opening from the first flow connection to be prevented by suitable measures. One such suitable measure is, advantageously, for the first flow connection in the separation chamber to be in the form of an upside down siphon. Furthermore, the siphon is preferably of such a size that any particles which nevertheless enter the outlet opening cannot pass through the siphon curve, which is located further above this point, and thus cannot enter the lower tube part.

In one preferred development, an inlet opening for water entering the separation chamber from the pressure vessel is arranged in the lower area element of the separation chamber and, in particular, in the vicinity of the chamber base. The loaded water thus flows into the separation chamber in the vicinity of the chamber base, so that this prevents particles from entering the outlet opening from the first flow connection, and thus from entering the lower tube part. For this purpose, provision is preferably also made for the separation chamber to be subdivided into two chamber elements which are connected to one another for flow purposes, with the inlet opening and the outlet opening being arranged in different chamber elements.

The arrangement of the inlet opening in the vicinity of the chamber base furthermore also has another advantage for the opposite flow situation, that is to say when water is forced out of the guide tube into the reactor pressure vessel. This is because particles are in this case passed out of the separation chamber back into the pressure vessel via the inlet opening, which now acts as an opening for water emerging from the separation chamber. This results in automatic self-cleaning of the separation chamber.

In one particularly expedient and simple embodiment, the two flow connections are in the form of simple, and in particular straight tubes. The inlet opening of the second flow connection is arranged underneath the outlet opening from the first flow connection.

In order to ensure that the water that enters the separation chamber enters and emerges only via the two flow connections, the chamber base and the chamber cover are each sealed with respect to the tube inner wall of the upper tube part. In consequence, a part of the tube inner wall is at the same time advantageously used as a boundary for the separation chamber. All that is therefore required to form the separation chamber is to arrange a chamber base and a chamber cover in the upper tube part. As an alternative to this, either just the chamber cover or the chamber base is sealed with respect to the tube inner wall of the upper tube part, and the separation chamber has its own side walls, which are at a distance from the tube inner wall. This makes it possible, for example, to insert the separation chamber into the guide tube from above, like an inserted part, and to be installed with the chamber cover or the chamber base on a projection on the tube inner wall, forming a seal.

According to one preferred development, the separator is arranged in the interior of the instrumentation lance. The separator is thus arranged in a cavity in the instrumentation lance. Since the physical space between the instrumentation lance and the tube inner wall of the guide tube is often confined, this refinement allows particularly simple assembly. In order to prevent loaded particles from entering the lower tube part, the separator represents the only flow connection between the upper tube part and the lower tube part. To this end, the instrumentation lance is preferably surrounded by a sealing ring, which is arranged between the instrumentation lance and the tube inner wall of the guide tube.

With the foregoing and other objects in view there is provided, in accordance with the invention, a method for preventing an accumulation of particles outside of a pressure vessel in a guide tube. The method includes steps of: providing a separator in an upper tube part of the guide tube; configuring the upper tube part of the guide tube within the pressure vessel; guiding an instrumentation lance into the pressure vessel with the guide tube; and using the separator to prevent particles from traveling from the upper tube part of the guide tube to other parts of the tube guide.

In accordance with an added mode of the invention, the method includes: providing the separator with a separation chamber having an outlet opening configured above an inlet opening; and configuring the separation chamber for operating such that, when water loaded with particles enters the inlet opening of the separation chamber, unloaded water emerges from the outlet opening of the separation chamber into a lower tube part of the guide tube.

In accordance with an additional mode of the invention, the method includes providing the separator with a separation chamber operating such that, when unloaded water flows out of a lower tube part of the guide tube into the separation chamber of the separator, water loaded with particles flows out of the separation chamber via a second flow connection into the pressure vessel.

Other features which are considered as characteristic for the invention are set forth in the appended claims.

Although the invention is illustrated and described herein as embodied in a guide tube for an instrumentation lance which extends into a pressure vessel, and a method for preventing the accumulation of particles in a guide tube such as this outside the pressure vessel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic illustration of a configuration of a guide tube with a built-in separator in a lower area of a reactor pressure vessel;

FIG. 2 is an enlarged illustration of the separator shown in FIG. 1;

DESCRIPTION OF THE PREFERRED EMBODIMENTS

Figure 3:
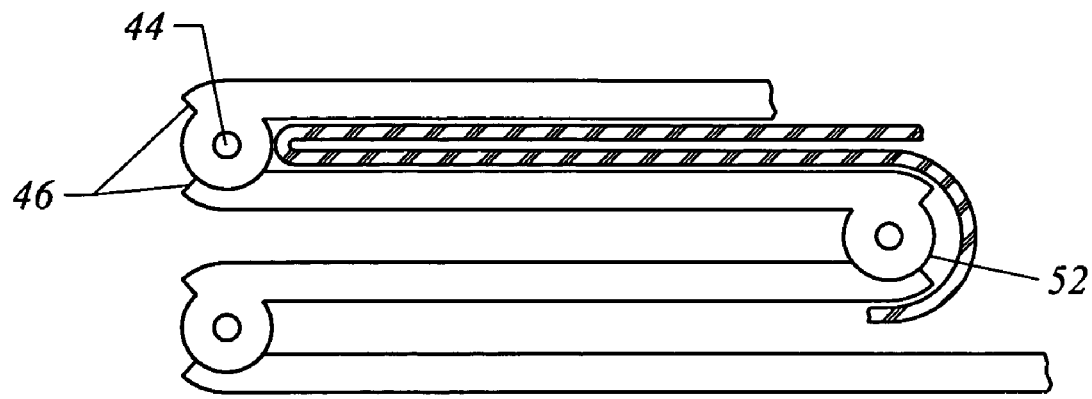
FIG. 3 is a schematic illustration of an alternate embodiment of the separator with an open separation chamber and a first flow connection designed like a siphon.

Parts having the same effect are provided with the same reference symbols throughout the figures.

Referring now to the figures of the drawing in detail and first, particularly, to FIG. 1 thereof, there is shown a guide tube 2 being passed from underneath into a reactor pressure vessel 6. The guide tube 2 runs through the base 4 of the reactor pressure vessel 6 into the interior 8 of the reactor pressure vessel 6. The guide tube 2 has an upper tube part 10, which extends into the interior 8, as well as a lower tube part 12, which is arranged outside the reactor pressure vessel 6. The guide tube 2 is closed at the end on the lower tube part 12 by a closure flange 14. An instrumentation lance 16 is passed through the guide tube 2, and extends into a reactor core 18 which is arranged in the reactor pressure vessel 6.

During operation, the reactor pressure vessel 6 and the guide tube 2 are filled with water. Temperature fluctuations result in water being exchanged between the guide tube 2 and the reactor pressure vessel 6. Both the upper tube part 10 and the lower tube part 12 typically have a length of about 5 meters. The guide tube 2 contains a total of about 10 liters of water, and the exchange of water resulting from temperature changes is at most 15–20% of this amount of water. When the water in the guide tube 2 cools down and its volume in consequence decreases, water is sucked into the guide tube 2 out of the reactor pressure vessel 6. Conversely, when the temperature of the water in the guide tube 2 rises, water is forced out of the guide tube 2 into the reactor pressure vessel 6.

A separator 20, in which radioactively loaded particles 22 are kept back, is arranged in the upper tube part 10. The separator 20 prevents the loaded particles 22 from entering the lower tube part 12 from the interior 8. This prevents the particles 22 from accumulating on the closure flange 14, and from forming a radiation source outside the reactor pressure vessel 6 at the closure flange 14. The configuration of the separator 20 is in this case based on the idea of allowing water that is loaded with particles 22 to enter the guide tube 2, since providing a seal on the guide tube 2, for example, a dirt cap, does not reliably prevent particles 22 from entering the guide tube 2. The particles 22 and the water are separated in the separator 20, with the water from which the particles 22 have been separated entering the lower tube part 12 as unloaded water. For this purpose, there is a flow connection from the lower tube part 12 to the separator 20, which allows the pressures to be equalized in a simple manner.

A particularly simple, but extremely effective embodiment of the separator 20, is shown in an enlarged form in FIG. 2. According to this figure, the separator 20 has a separation chamber 24, which is closed at the top by a chamber cover 26 and at the bottom by a chamber base 28. The side boundary is formed by the tube inner walls 30 of the guide tube 2. The chamber cover 26 and the chamber base 28 are each sealed with respect to the tube inner wall 30 via a seal 32. This seal 32 is, in particular, in the form of a ring seal which runs in a groove in the chamber cover 26 and in the chamber base 28.

The instrumentation lance 16 is guided centrally in the guide tube 2, and passes through both the chamber cover 26 and the chamber base 28.

The separator 20 also has a first flow connection 34, which is in the form of a straight tube and allows water to be exchanged between the separation chamber 24 and the lower tube part 12. At the end, the first flow connection 34 has an outlet opening 36 in the separation chamber 24. A second flow connection 38 is also arranged alongside it, is likewise in the form of a straight tube and connects the separation chamber 24 to the interior 8 of the reactor pressure vessel 6. The second flow connection 38 has an inlet opening 40 arranged in the separation chamber 20.

The two flow connections 34, 38, which are in the form of tubes, respectively pass through the chamber cover 26 and the chamber base 28. The two flow connections 34, 38 are in this case arranged such that the inlet opening 40 is arranged underneath the outlet opening 36. This safely ensures that water which is loaded with particles 22 and which is introduced into the separation chamber 24 via the second flow connection 38 does not pass via the first flow connection 34 into the lower tube part 12. This arrangement also ensures that loaded water in the area of the chamber base 28 enters the separation chamber 24 from the inlet opening 40. The particles 22 which are carried with the water are deposited on the chamber base 28. The water in the upper area of the separation chamber 24 is free of contamination. The outlet opening 36 is arranged in this upper area. In consequence, only unloaded water leaves via this outlet opening 36. If the temperature-dependent flow conditions are reversed, then water is forced out of the lower tube part 12 into the separation chamber 24, and from there into the reactor pressure vessel 6. Thus, in this case, water flows via the outlet opening 36 into the separation chamber 24, and via the inlet opening 40 into the reactor pressure vessel 6. The arrangement of the inlet opening 40 in the lower area of the separation chamber 24 automatically results in loaded water being forced back into the interior 8. This prevents the separation chamber 24 from gradually being filled up with particles 22.

Figure 4:
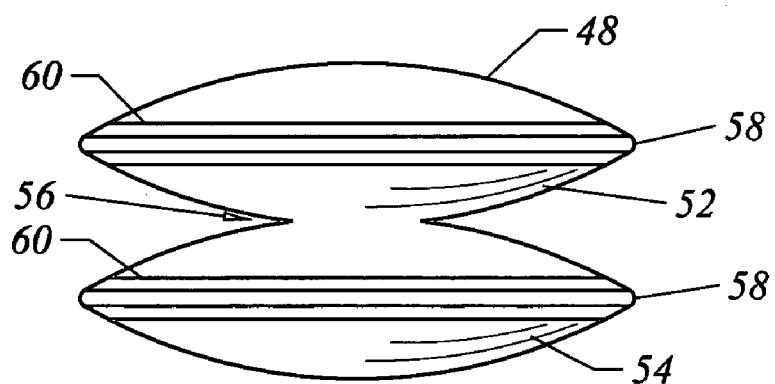
FIG. 4 is a schematic illustration of a further embodiment of a separator with a separation chamber that is subdivided by a separating wall into two chamber elements.

FIGS. 3 and 4 show alternate embodiments of the separator 20, illustrating only those elements that are relevant to the flows that take place and, for example, with the instrumentation lance 16 not being illustrated.

As is shown in FIG. 3, the separation chamber 24 is in the form of a settling chamber, open at the top, which has only the chamber base 28. In consequence, there is no need for a second flow connection 38. The first flow connection 34 has an upside down siphon 42 in the interior of the separation chamber 24. Its siphon curve 44 is thus arranged above the outlet opening 36. This configuration prevents deposited particles 22 from falling into the outlet opening 36 from above, and thus from entering the lower tube part 12. In order to prevent particles 22 from entering the outlet opening 36, this outlet opening 36 is also at a distance from the chamber base 28. Furthermore, the length L of the tube element 45 between the outlet opening 36 and the start of the siphon curve 44 is preferably of a suitable size. To be precise, this size is such that the maximum amount of temperature-dependent water that can be expected to be exchanged between the reactor pressure vessel 6 and the guide tube 2 corresponds to the majority or all of the volume that is enclosed by the tube element 45. This prevents the particles 22 from being passed through the siphon curve 44, even if loaded water enters the outlet opening 36.

According to the further alternative that is illustrated in FIG. 4, the separation chamber 24 is separated by a separating wall 46 into two chamber elements 24A and 24B. The separating wall extends from the chamber cover 26, which is provided with a hole that forms the second flow connection 38, into the lower area of the separation chamber 24. The first flow connection 34 is once again in the form of a straight tube, which extends into the second chamber element 24B. Its outlet opening 36 is arranged in the upper area, in the vicinity of the chamber cover 26. The separation chamber 24 once again acts as a settling chamber, with the particles 22 being deposited on the chamber base 28. This reliably prevents particles 22 from directly entering the outlet opening 36, via the hole, through the separating wall 46.

Figure 5:
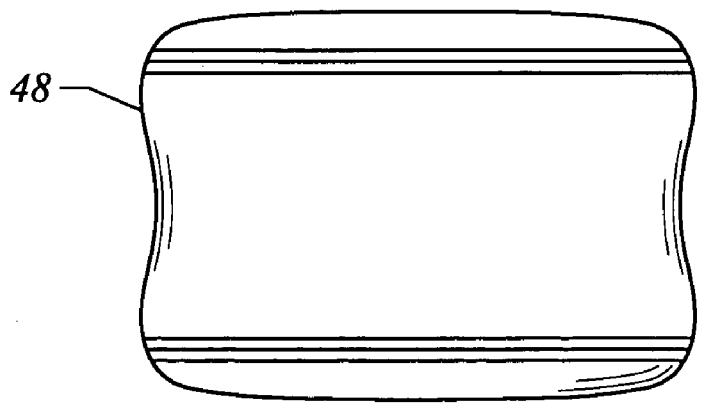
FIG. 5 is a schematic illustration of a separator with a separation chamber that has side walls that are at a distance from the tube inner wall of the guide tube, and an outlet communicating with the lower tube part.
Figure 6:
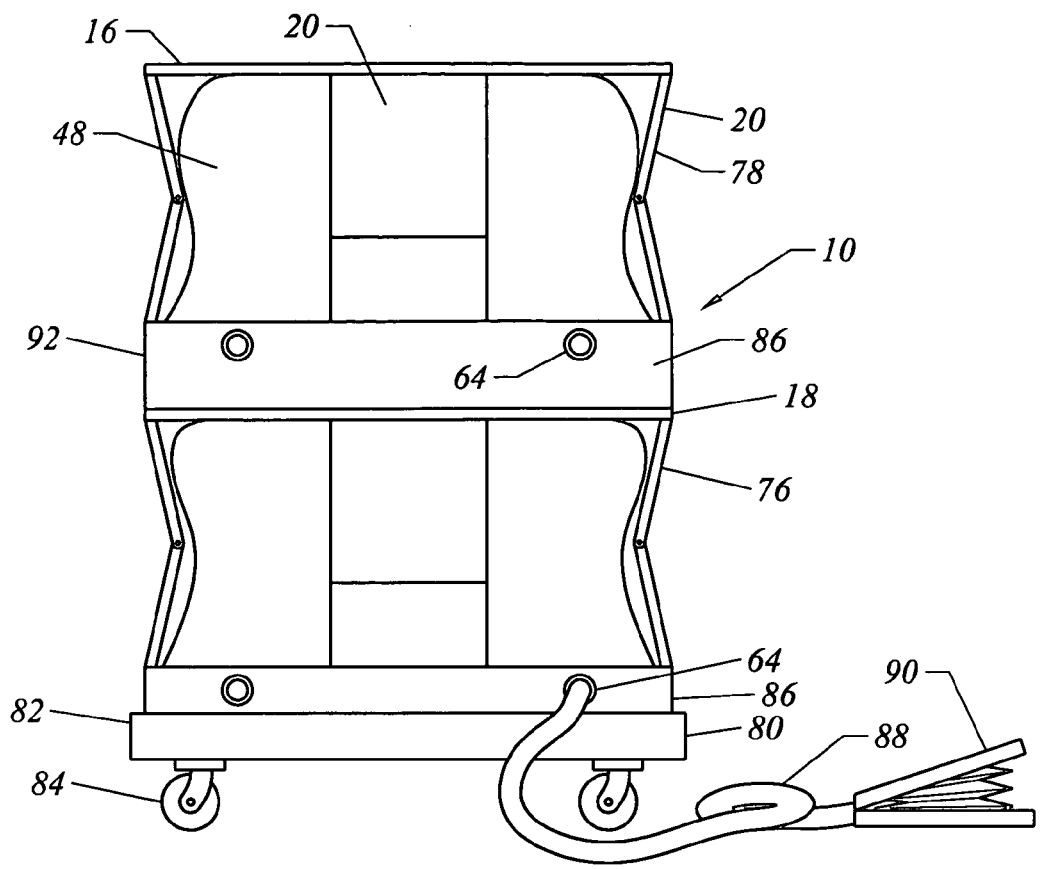
FIG. 6 is a schematic illustration of a separator of the type illustrated in FIG. 5, with the flow connection to the lower tube part being formed by a tube.

According to the exemplary embodiments shown in FIGS. 5 and 6, the separation chamber 24 has a side wall 50 which is designed to have a cross section in the form of a circular ring and is at a distance from the tube inner wall 30. The seal with respect to the tube inner wall 30 is provided only via the chamber cover 26. In particular, the separation chamber 24 is in the form of an autonomous unit.

A hole is incorporated into the side wall 50, in the vicinity of the chamber cover 26, as an outlet opening 36 for connection to the lower tube part 12. The water can enter the intermediate space between the side wall 50 and the tube inner wall 30 from the separation chamber 24 via this hole. The second flow connection 38 to the upper tube part 10 is formed by a straight tube, whose inlet opening 40 is arranged in the area of the chamber base 28.

In contrast to the separation chamber 24 shown in FIG. 5, the separation chamber 24 shown in FIG. 6 has a first flow connection 34, which is in the form of a tube, to the lower tube part 12. No hole is provided in the side wall 50. This embodiment corresponds to the embodiment illustrated in FIG. 2, with the measure that the separation chamber shown in FIG. 6 has a side wall 50 and, in particular, is in the form of an autonomous unit. In the embodiment shown in FIG. 6, there is no need for any flow space between the side wall 50 and the tube inner wall 30, as a result of the first flow connection 34 that is formed by the tube.

Figure 7:
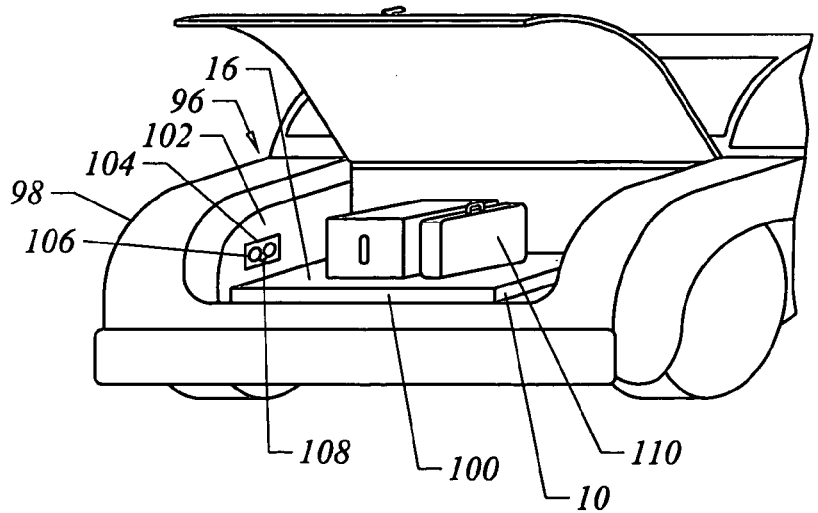
FIG. 7 is a schematic illustration of a separator in an instrumentation lance being passed through the guide tube.

FIG. 7 shows one particularly advantageous embodiment, in which the separator 20 is integrated in the interior of the instrumentation lance 16. The instrumentation lance 16 is normally in the form of a cylindrical hollow body. The chamber cover 26 and the chamber base 28 are connected directly to the inner wall 52 of the tubular instrumentation lance 16, and, in particular, are welded to it. The second flow connection is once again in the form of a straight tube, and connects the separation chamber 24 to an upper cavity 54 in the instrumentation lance. The separation chamber 24 has a flow connection via this upper cavity 54 to the interior 8 of the reactor pressure vessel 6. By way of example, a flow opening to the reactor pressure vessel 6 is incorporated in the instrumentation lance 16 for this purpose, or the instrumentation lance has a flow opening at its upper end (neither of which is illustrated).

In order to prevent loaded particles from entering the lower tube part 12 through the intermediate space between the tube inner wall 30 of the guide tube 2 and the instrumentation lance 16, the instrumentation lance 16 is sealed by a sealing ring 56 with respect to the tube inner wall 30. The only flow connection between the lower tube part 12 and the reactor pressure vessel 6 is the separation chamber 24. In this case, the separation chamber 24 has a hole in the tube wall of the instrumentation lance, which acts as an outlet opening 36 and allows a flow connection to be formed to the lower tube part 12. A further hole 58 is incorporated in the tube wall of the instrumentation lance 16 underneath the separation chamber 24, so that a lower cavity 60 in the instrumentation lance 16 has a flow connection to the lower tube part 12.

The variant which is illustrated in FIG. 7 and which has the separator 20 integrated in the instrumentation lance 16 is particularly simple to assemble. In general, the installation space formed between the instrumentation lance 16 and the tube inner wall 30 is confined, and in general arranging tubes in the intermediate space between the tube inner wall 30 and the instrumentation lance 16 involves effort since the spatial conditions there are usually confined.

What is claimed is:

1. A guide tube for guiding an instrumentation lance into an interior of a pressure vessel, the guide tube comprising:
    a lower tube part;
    an upper tube part for configuration in the interior of the pressure vessel; and
    a particle separator configured in said upper tube part;
    said separator having a separation chamber;
    said separation chamber having a first flow connection for exchanging water between said upper tube part and said lower tube part.

2. The guide tube according to claim 1, wherein:
    said separation chamber has a chamber base;
    said first flow connection has an outlet opening configured in said separation chamber; and
    said outlet opening is located at a distance from said chamber base.

3. The guide tube according to claim 2, further comprising:
    a chamber cover closing said separation chamber;
    said separation chamber having a second flow connection for connecting to the interior of the pressure vessel.

4. The guide tube according to claim 3, wherein:
    said separation chamber has a lower region; and
    said second flow connection has an inlet opening configured in said lower region of said separation chamber.

5. The guide tube according to claim 4, wherein:
    said first flow connection is formed as a tube;
    said second flow connection is formed as a tube;
    said inlet opening of said second flow connection is configured in said separation chamber; and
    said inlet opening of said second flow connection is configured underneath said outlet opening of said first flow connection.

6. The guide tube according to claim 3, wherein:
    said upper tube part has a tube inner wall; and
    said chamber base is sealed with said tube inner wall of said upper tube part.

7. The guide tube according to claim 3, wherein:
    said upper tube part has a tube inner wall; and
    said chamber cover is sealed with said tube inner wall of said upper tube part.

8. The guide tube according to claim 1, in combination with the instrumentation lance, wherein:
    the instrumentation lance has an interior; and
    said separator is configured in the interior of the instrumentation lance.

9. The guide tube according to claim 1, in combination with a reactor pressure vessel for a nuclear power station, wherein the guide tube extends into the nuclear power station.

* * * * *